Jan. 15, 1963  A. P. BENTLEY  3,073,418
CONSTANT TENSION HYDRAULIC BRAKE
Filed July 23, 1958  3 Sheets-Sheet 1

INVENTOR.
ARTHUR P. BENTLEY
BY Robert C. Sullivan
ATTORNEY

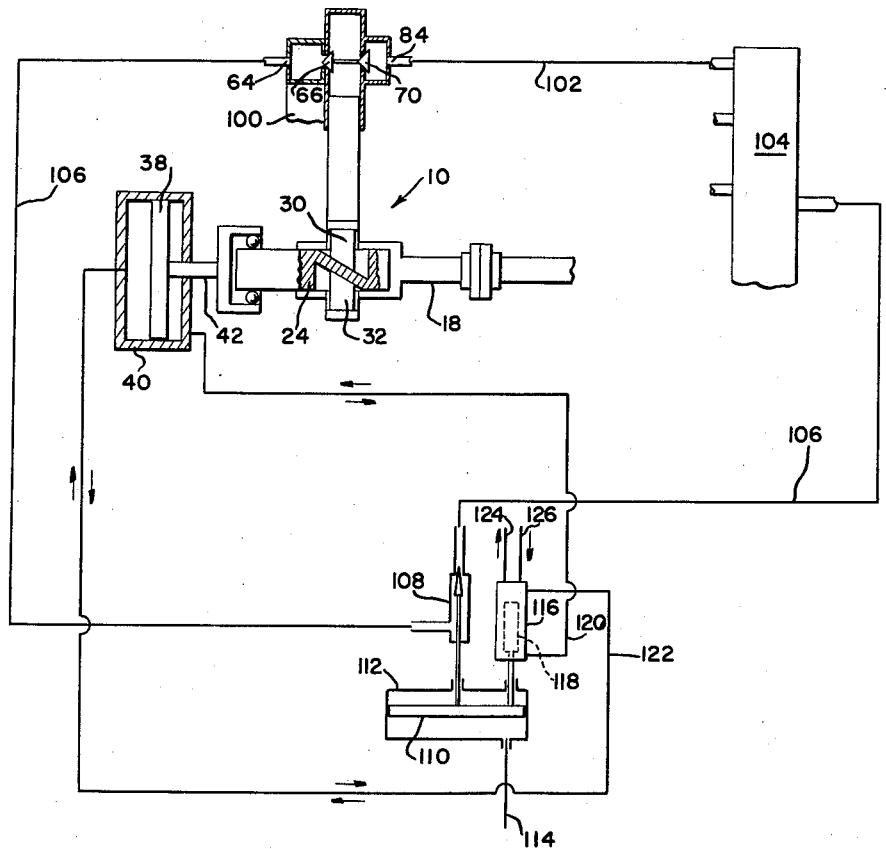
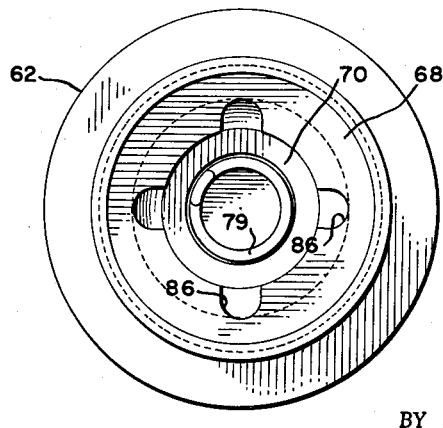

United States Patent Office 3,073,418
Patented Jan. 15, 1963

3,073,418
CONSTANT TENSION HYDRAULIC BRAKE
Arthur P. Bentley, Fredericksburg, Tex., assignor to Fred-Tex Machine, Incorporated, Gillespie County, Tex., a private corporation
Filed July 23, 1958, Ser. No. 750,516
4 Claims. (Cl. 188—91)

This invention relates to a brake apparatus and system for maintaining a constant braking action on a rotating shaft, and more particularly to a fluid or hydraulic brake capable of maintaining constant torque on a shaft over a wide range of r.p.m. of the shaft being controlled.

In many industrial applications it is necessary to maintain a constant braking action on a rotating shaft over a wide speed range of the shaft being controlled. For example, in the paper industry, large rolls of paper are unwound from a paper roll shaft with the revolutions per minute of the paper roll shaft increasing tremendously as the paper unwinds. A considerable problem is created in maintaining a constant tension on the web of paper being unwound over the wide speed range of the paper roll shaft as the paper is being unwound.

In describing the present invention, reference will be made to use of the constant tension hydraulic brake as a brake for a paper roll shaft. However, it will be understood that this is but one of many possible applications of the subject invention.

Accordingly, it is an object of this invention to provide a brake apparatus and system capable of automatically maintaining a constant braking action on a rotating shaft over a wide speed range of the shaft.

It is another object of this invention to provide an automatic hydraulic brake apparatus and system for maintaining a constant tension on a web of material being payed out by a rotating shaft, including automatic control means for causing the brake to maintain constant braking action on the controlled shaft over a wide range of speed of the shaft.

Still another object of this invention is to provide an automatic brake apparatus capable of maintaining a constant torque on a controlled rotating shaft over a wide speed range of the controlled shaft.

Still another object of the invention is to provide an automatic tension control apparatus and system in which the tension can be set at a predetermined desired value and automatically maintained at the set value over a wide range of speed of the apparatus being controlled.

In achievement of these objectives, there is provided in accordance with an embodiment of this invention a constant tension hydraulic brake apparatus and system including a brake member which is coupled to a shaft whose tension is being controlled. The brake includes a plurality of reciprocating piston members which pump hydraulic fluid through a closed circuit against a predetermined hydraulic resistance. The stroke of the piston members is controlled by an eccentric member whose eccentricity is automatically adjusted in proportion to the speed of the shaft being controlled in such manner that the piston members always pump a constant volume of hydraulic fluid per unit of time through the closed circuit regardless of the rotary speed of the shaft which is being braked. Due to the fact that a constant volume of hydraulic fluid is always pumped by the piston members of the hydraulic brake, the brake always exerts a constant braking action on the shaft to which it is coupled, thereby maintaining a constant tension on a web of material which may be payed out by the shaft which is being braked. The hydraulic resistance of the circuit may be adjusted to change the value of the constant tension maintained by the hydraulic brake.

Further objects and advantages will become apparent from the following description taken in conjunction with the accompanying drawings in which:

FIG. 3 is a schematic diagram of the constant tension hydraulic brake including the automatic control system for the brake; and FIG. 4 is a view in section along line 4—4 of FIG. 1.

Figure 1:
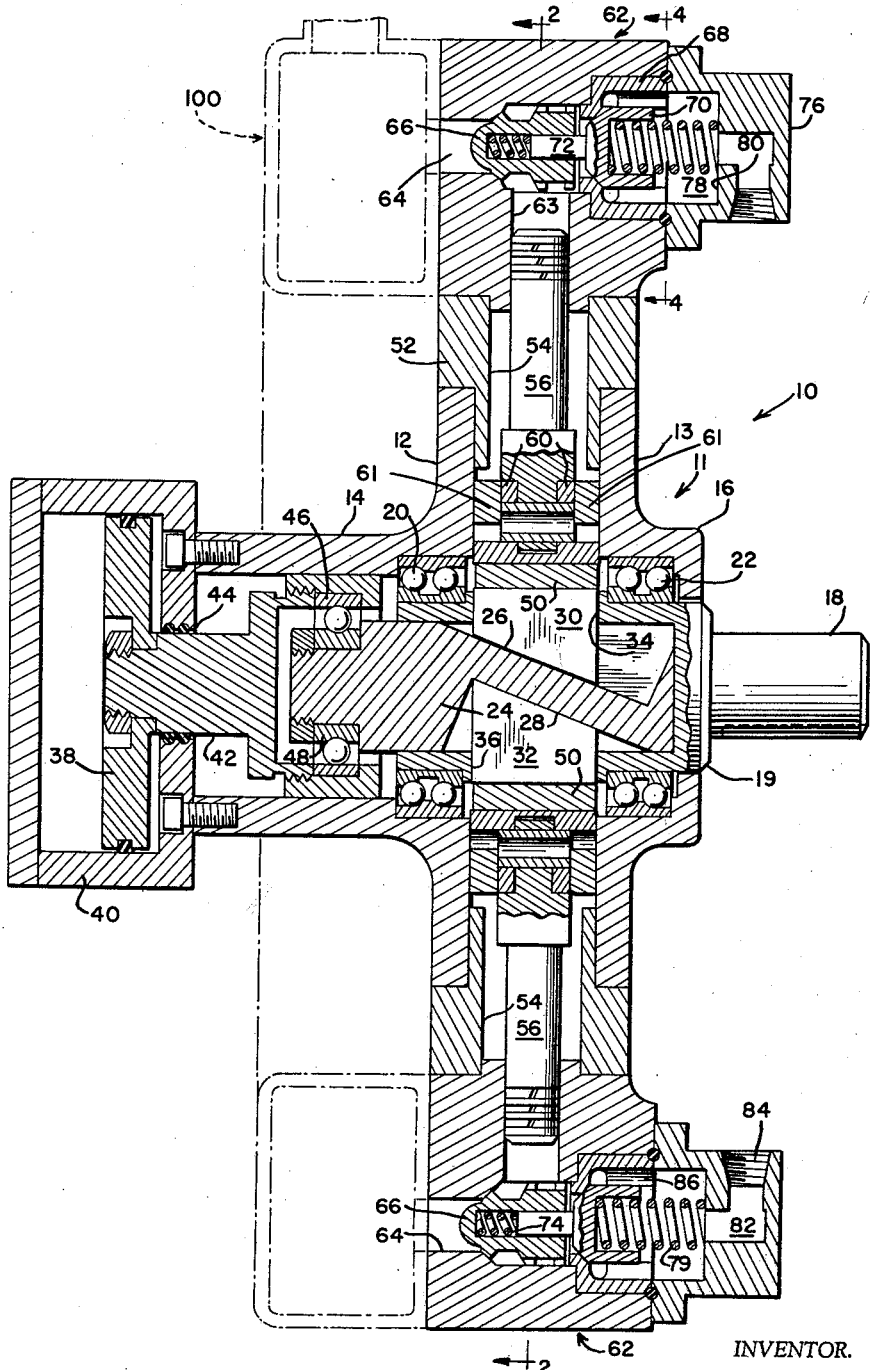
FIG. 1 is a view in longitudinal section of the constant tension hydraulic brake of the invention.
Figure 2:
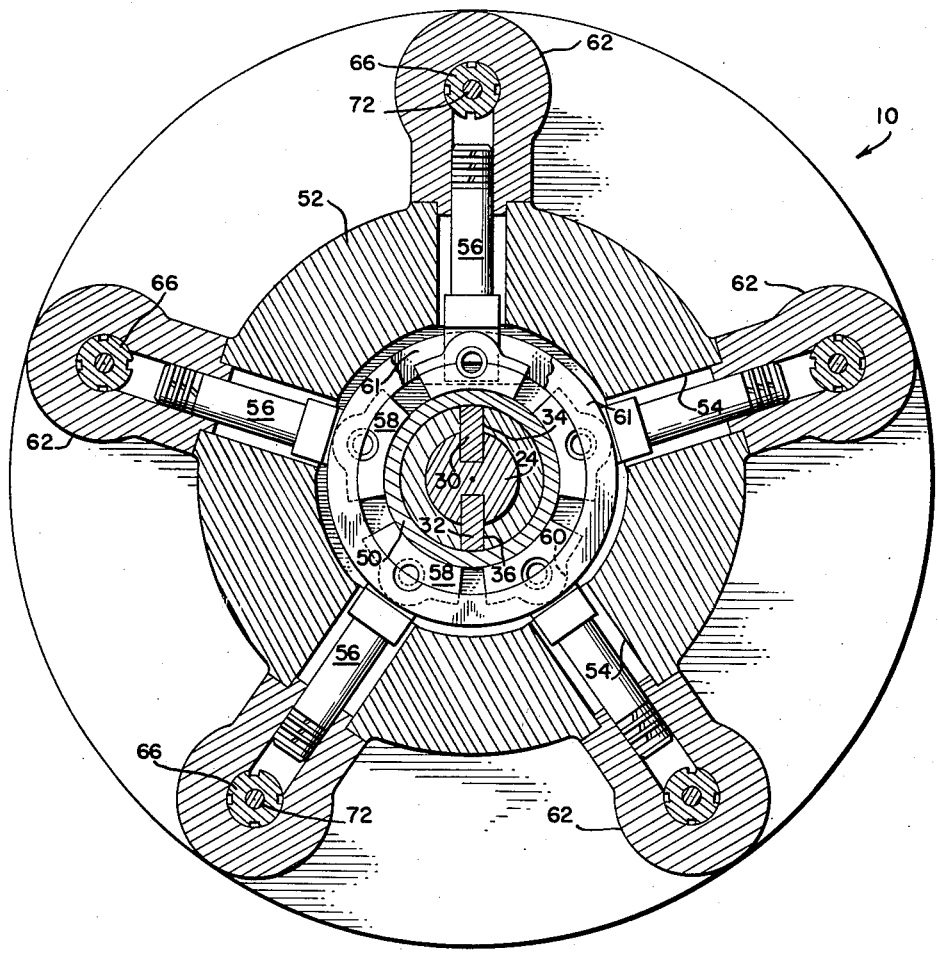
FIG. 2 is a view in section along line 2—2 of FIG. 1.

Referring now to the drawings, and more particularly to FIGS. 1 and 2, the hydraulic brake is generally indicated at 10 and includes a housing generally indicated at 11 of substantially circular shape having a pair of axially spaced wall members 12 and 13. A hollow axial extension 14 is integral with and projects from wall 12, and a shorter hollow axial extension 16 is integral with and projects from wall 13. Extensions 14 and 16 both lie on the central longitudinal axis of housing 11.

A shaft member 18 which is suitably coupled to the shaft whose tension is to be controlled, such as a paper roll shaft, for example, includes a portion 19 of larger diameter which is supported within the hollow passage defined by the axial extensions 14 and 16 by two axially spaced ball bearing assemblies 20 and 22, respectively.

The interior of the enlarged portion 19 of shaft 18 is hollow and slidably receives an actuator shaft member 24 having at one end thereof inclined ramp surfaces 26 and 28. Ramp surfaces 26 and 28 of shaft 24 engage radially movable key members 30 and 32 received in diametrically opposite slots 34 and 36 of enlarged portion 19 of shaft 18. Shaft 24 with its inclined ramp surfaces 26 and 28 is linearly moved by a "volume control" piston member 38 movable in a cylinder 40 connected to the end of axial extension 14 of housing 11. Piston 38 is connected to shaft 24 through an operating rod member 42 which passes through a suitably sealed opening 44 of cylinder 40 and is connected to the outer race 46 of a ball bearing assembly whose inner race 48 is connected to the end of shaft 24 opposite the end at which its ramp surfaces 26 and 28 are located. Due to the structure just described, linear movement of piston 38 in cylinder 40 causes sliding movement of actuator shaft 24 along the hollow interior of enlarged portion 19 of shaft 18. Furthermore, actuator shaft 24 can rotate freely with respect to operating rod 42 connected to piston 38.

A circular cam ring 50 is rigidly connected to the outer periphery of key members 30 and 32 and radial movement of the key members 30 and 32 due to sliding movement of actuator shaft 24 causes the center of circular cam ring 50 to move radially with respect to the central longitudinal axis of shaft 18. Actuator shaft 24, key members 30 and 32 and cam ring 50 all rotate as a unit with shaft 18 which is coupled to the shaft being braked.

Rigidly attached to the outer periphery of housing 11 is a circular ring-like member which will be referred to hereinafter as the "star" section. Star section 52 is a solid cast-iron piece which is provided at spaced circumferential intervals with radial bores such as that indicated at 54. In the present embodiment, five such radial bores 54 are provided in star section 52, radial bores being angularly displaced from each other by 72 degrees of the circumference of star section 52. Movable in each of the bores 54 is a piston member 56 whose radially inner end is connected by a suitable wrist-pin to the radially extending bosses 60 of an arcuate shoe member 58 which rests upon the radially outer surface of cam ring 50. Shoe member 58 is preferably made of aluminum. In the illustrated embodiment, five shoe members 58 are positioned at circumferentially spaced intervals around the periphery of cam ring 50, each shoe 58 corresponding to and being connected to the radially inner end of one of the piston members 56. Mounted on a turned boss on each side of each shoe 58 are two steel "return rings" 61 which serve to maintain shoe 58 and cam ring 50 in proper contacting relation.

At each bore position, a flat is milled on the radially outer surface of star section 52 and a cast cylinder head 62 is mounted on each milled flat. Each cylinder head is provided with a radially extending bore 63 which defines a cylinder which receives the upper end of piston 56. An inlet port 64 extends inwardly from the face of each cylinder head 62 lying adjacent wall 12 of housing 11. Inlet port 64 is normally closed by an intake valve 66, preferably made of aluminum, which engages a suitable valve seat at the inner periphery of port 64. Extending inwardly from the opposite face of cylinder head 62 and on the same center line as inlet valve 66 is an exhaust valve insert 68 which provides a seat for an exhaust valve 70, which may be made of steel. The inner end of exhaust valve 70 carries a pintle member 72 which extends into a bore in inlet valve 66 to provide a guide for the movement of the inlet valve. A spiral spring member 74 is interposed between the inlet valve 66 and the outer end of pintle 72 for priming purposes when the pump is initially put into operation.

An exhaust cap member 76 is secured to the outer face of cylinder head 62 adjacent exhaust valve seat 68. Cap member 76 includes a bore extending axially from the inner face thereof to define an exhaust chamber 78. A relatively strong spring member 79 is provided to bias exhaust valve 70 to its seat, one end of the spring being received in a bore in the exhaust valve, while the opposite end of the spring bears against wall 80 bounding exhaust chamber 78 in cap 76. Exhausting chamber 78 communicates with passage 82 which in turn communicates with radially extending exhaust outlet opening 84.

Exhaust valve insert 68 is provided with a plurality of passages such as those indicated at 86 spaced around the seat for exhaust valve 70, the entrances to passages 86 being accessible to the exhaust fluid when valve 70 lifts from its seat. The plurality of passages 86 extend through the body of exhaust valve insert 68 and provide a tremendous cooling effect upon the exhaust oil as it passes to exhaust chamber 78.

*Control System for Brake*

The control system for the constant tension hydraulic brake will now be described, with particular reference to FIG. 3 of the drawings.

The entire brake is submerged in oil or other hydraulic fluid to provide what, in effect, is a common inlet manifold 100 to all of the inlet valves 66 since all of the inlet valves communicate with the oil bath in which the brake is immersed.

The outlet 84 of each exhaust valve 70 is connected through a conduit 102 to a common exhaust manifold 104, manifold 104 in turn being connected through a conduit 106 back to the oil bath in which the brake is immersed to thereby complete the hydraulic circuit. Interposed in conduit 106 is a hydraulic resistance formed by a valve element 108 carried by a piston member 110 which moves in an air cylinder 112. The hydraulic resistance represented by valve 108 can be adjusted to a desired value by causing the air pressure in control pressure line 114 communicating with air cylinder 112 to be adjusted to a predetermined desired value. The hydraulic resistance offered by value 108 is equal to the air pressure in control line 114 multiplied by the area of piston 110. This pressure may be preselected at a control panel or may be selected by a suitably located pendent air regulator.

Suitably mounted on the cover of air cylinder 112 is a four-way servo valve 116 which controls the flow of pressurized air to opposite sides of the volume control piston 38 operating in volume control cylinder 40. The movable spool member 118 of the four-way valve 116 is connected to and movable with piston 110. The movable spool member 118 controls flow of air through conduits 120 and 122 to opposite sides of piston 38 in cylinder 40, to thereby control the position of actuator shaft 24 and the eccentricity of cam ring 50. Air is supplied and exhausted from four-way valve 116 through the respective conduits 124 and 126.

*Summary of Operation*

Air pressure is selected at the control panel or at the pendent regulator to properly bias valve 108 through air pressure conduit 114 to provide a hydraulic resistance in line 106 corresponding to the tension required. When the air pressure in cylinder 112 forces valve 108 to its seat in conduit 106, it also moves spool member 118 of four-way servo valve 116 to a position in which volume control piston 38 is moved its maximum stroke to the left with respect to the views shown in FIGS. 1 and 3 to thereby shift ramp surfaces 26 and 28 to a position in which cam ring 50 is at its maximum eccentricity. With cam ring 50 at its maximum eccentricity, pistons 56 are caused to move for their full stroke.

As the paper roll shaft begins to unwind, shaft 18 is rotated, rotating cam ring 50 and causing pistons 56 to reciprocate in their respective cylinders 63. Reciprocation of pistons 56 causes the hydraulic fluid to be drawn in through the inlet ports 64 and exhausted through the outlet ports 84. As the speed of the pumping action increases, valve 108 is forced far enough from its seat in conduit 106 to move spool 118 of four-way valve 116 to a position in which air is admitted through conduit 122 to volume control cylinder 40 and exhausted through conduit 120 to cause movement of piston 38 toward the right with respect to the views shown in the drawings. Actuator shaft 24 with its ramp surfaces 26 and 28 is thereby moved to a position in which cam ring 50 is at less than its maximum eccentricity, to thereby reduce the stroke of pistons 56 somewhat from the maximum stroke. As the speed of the paper roll shaft continues to increase, volume control piston 38 is moved further and further to the right to thereby further decrease the eccentricity of cam ring 50, with consequent decrease in the stroke of reciprocating pistons 56. Finally at extreme speeds of the paper roll shaft, the volume control piston 38 is moved to a position in which the corresponding position of ramp surfaces 26 and 28 is such that cam ring 50 is at a nearly neutral position in which the stroke of pistons 56 is extremely small. The movement of volume control piston 38 under the control of four-way valve 116 is such that the stroke of pistons 56 decreases in proportion to the increase in speed of the paper roll shaft as it unwinds. The total volume of hydraulic fluid pumped by pistons 56 through conduit 106 and past the hydraulic resistance offered by valve 108 per unit time, remains substantially constant throughout the entire speed range of the paper roll shaft, since the decrease in amount of hydraulic fluid pumped for each stroke of pistons 56 offsets the increase in speed of rotation of shaft 18, so that the total hydraulic fluid pumped remains constant at all times. Since the braking load on the paper roll shaft provided by brake 10 is proportional to the volume of hydraulic fluid pumped and the hydraulic resistance of the circuit through which the hydraulic fluid moves, the constant volume of fluid pumped throughout the entire speed range of the paper roll shaft, maintains a constant braking action on the paper roll shaft, with a consequent constant tension on the paper being unwound from the paper roll shaft.

It can be seen from the foregoing that there is provided in accordance with this invention a brake apparatus and system which has great utility in maintaining constant tension on a web of paper or the like being unwound from a shaft throughout a wide speed range of the shaft from which the paper is being unwound, and that the hydraulic brake has many other applications where it is desired to maintain a constant braking action on a rotating shaft or the like. In an actual embodiment of the invention which has been constructed, a constant torque has been maintained on the controlled shaft throughout a range of 1 r.p.m. to 3,000 r.p.m.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A brake apparatus for applying a constant braking action to a rotating shaft comprising a rotatable driven shaft coupled to the rotating shaft being braked, a cylinder, a hydraulic circuit including fluid inlet and outlet passages to said cylinder, a piston movable in said cylinder and effective to cause movement of fluid through said inlet and outlet passages to pump fluid through said hydraulic circuit, a cam means rotatable with said driven shaft and movable to an eccentric position with respect to said driven shaft, said cam means being positioned to effect movement of said piston in accordance with the degree of its eccentricity, motor means connected to said cam means and actuatable to vary the eccentricity of said cam means, sensing means interposed in said hydraulic circuit for detecting changes in the speed of the shaft being braked and for providing an indication of detected changes in said speed, and further means connected to said sensing means for relaying the indication of said sensing means to said motor means to actuate said motor means to vary the eccentricity of said cam means as a function of the speed of the shaft being braked whereby the stroke of said piston is varied to maintain constant pumping volume per unit time in said hydraulic circuit.

2. A brake apparatus for applying a constant braking action to a rotating shaft comprising a rotatable driven shaft coupled to the rotating shaft being braked, a cylinder, a hydraulic circuit in fluid communication with said cylinder, a piston movable in said cylinder and effective to pump fluid through said hydraulic circuit, cam means rotatable with said driven shaft and movable to an eccentric position with respect to said driven shaft, said cam means being positioned to be in driving relation to said piston, the stroke of said piston depending on the degree of eccentricity of said cam means, a fluid motor means, means connecting said fluid motor means to said cam means whereby said fluid motor means is effective to vary the eccentricity of said cam means to thereby control the stroke of said piston, control means responsive to changes in speed of the shaft being braked for controlling said fluid motor means, said control means including a movable restriction in said hydraulic circuit, means for applying a predetermined biasing pressure against said movable restriction to permit adjusting the braking action of said apparatus to a predetermined constant value, said restriction being movable in accordance with fluid flow changes in said hydraulic circuit produced by variations in speed of the shaft being braked, and means responsive to the position of said restriction for controlling the supply of fluid to said fluid motor means whereby said fluid motor means controls the eccentricity of said cam means and the stroke of said piston as a function of the speed of the shaft being braked.

3. A brake apparatus for applying a constant braking action to a rotating shaft comprising a rotatable driven shaft coupled to the rotating shaft being braked, a cylinder, a hydraulic circuit including fluid inlet and outlet passages to said cylinder, a piston movable in said cylinder and effective to cause movement of fluid through said inlet and outlet passages to pump fluid through said hydraulic circuit, a cam ring rotatable with said driven shaft and movable to an eccentric position with respect to said driven shaft, said cam ring being positioned in driving relation to said piston, the stroke of said piston depending on the degree of eccentricity of said cam ring, radially adjustable key means supporting said cam ring, a fluid motor means, an actuator shaft linearly moved by said fluid motor means, said actuator shaft including ramp surfaces engaging said key means and effective to radially adjust the position of said key means to thereby vary the eccentricity of said cam ring and the stroke of said piston, and means responsive to changes in speed of the shaft being braked and controlling said fluid motor means as a function of speed changes of said shaft being braked, said control means including a movable restriction in said hydraulic circuit, means for applying a predetermined biasing pressure against said movable restriction to permit adjusting the braking action of said apparatus to a predetermined constant value, said restriction being movable in accordance with variations in speed of the shaft being braked, and means responsive to the position of said restriction for controlling the supply of fluid to said fluid motor means whereby said fluid motor means controls the eccentricity of said cam ring and the stroke of said piston as a function of the speed of the shaft being braked.

4. A brake apparatus for applying a constant braking action to a rotating shaft comprising a rotatable driven shaft coupled to the rotating shaft being braked, a cylinder, a hydraulic circuit including fluid inlet and outlet passages to said cylinder, a first piston movable in said cylinder and effective to cause movement of fluid through said inlet and outlet passages to pump fluid through said hydraulic circuit, a cam ring rotatable with said driven shaft and movable to an eccentric position with respect to said driven shaft, said cam ring being positioned to be in driving relation to said first piston, the stroke of said first piston depending on the degree of eccentricity of said cam ring, radially adjustable key means supporting said cam ring, a volume control cylinder, a volume control piston movable in said volume control cylinder, an actuator shaft linearly moved by said volume control piston, said actuator shaft including ramp surfaces engaging said key means and effective to radially adjust the position of said key means to thereby vary the eccentricity of said cam ring and the stroke of said first piston, control means responsive to changes in speed of said shaft being braked and controlling said volume control piston in proportion to speed changes of said shaft being braked, said control means including a movable restriction in said hydraulic circuit, means for applying a predetermined biasing pressure against said movable restriction to permit adjusting the braking action of said apparatus to a predetermined constant value, said restriction being movable in accordance with variations in speed of the shaft being braked, and means responsive to the position of said restriction for controlling the supply of fluid to said volume control cylinder whereby said volume control piston controls the eccentricity of said cam ring and the stroke of said first piston as a function of the speed of the shaft being braked.

References Cited in the file of this patent

UNITED STATES PATENTS

| | | |
|---|---|---|
| 1,099,116 | Church | June 2, 1914 |
| 1,649,347 | Hardt | Nov. 15, 1927 |
| 2,084,244 | Critz | June 15, 1937 |
| 2,125,640 | Marsh | Aug. 2, 1938 |
| 2,539,277 | Schroepfer | Jan. 23, 1951 |
| 2,551,677 | Hoffstrom | May 8, 1951 |
| 2,850,122 | Alishouse | Sept. 2, 1958 |

FOREIGN PATENTS

| | | |
|---|---|---|
| 802,046 | France | May 30, 1936 |
| 482,428 | Great Britain | Mar. 29, 1938 |
| 722,861 | Great Britain | Feb. 2, 1955 |